Patented Nov. 25, 1941

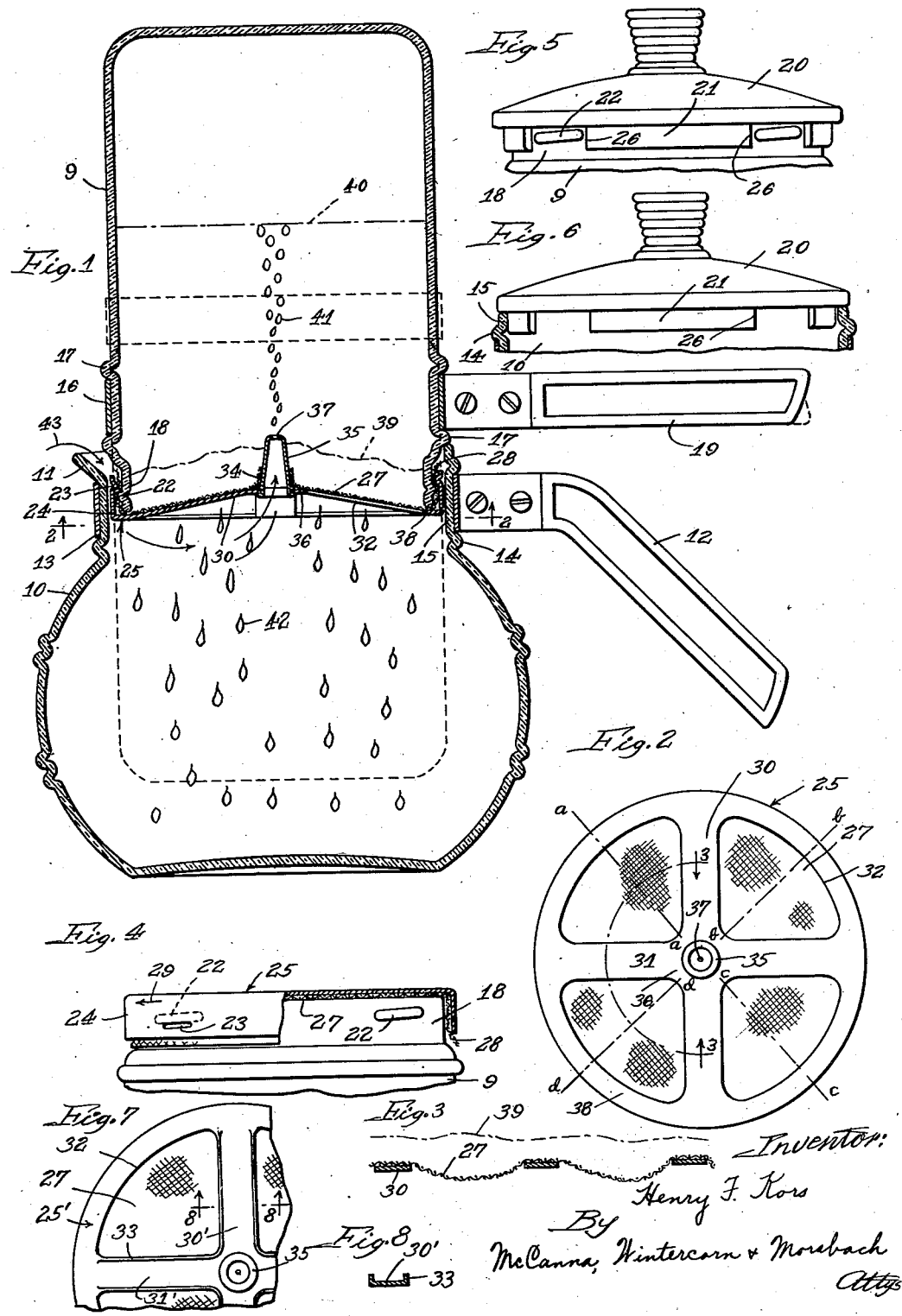

2,263,881

UNITED STATES PATENT OFFICE 2,263,881

COFFEE BREWER

Henry F. Kors, Chicago, Ill., assignor to Korwood Incorporated, Chicago, Ill., a corporation of Kansas Application August 17, 1939, Serial No. 290,583

9 Claims. (Cl. 53—3)

This invention relates to an improved coffee brewer, and is concerned in particular with improvements in the double-boiler type disclosed in my earlier application Serial No. 219,751, filed July 18, 1938.

The principal object of my present invention is to provide an improved filter head for quickly detachable application to the mouth of the inner bowl clamping a filter cloth in place therebetween, the filter head being of open spider construction so that ample areas of the cloth are exposed for quick filtering of the coffee therethrough, and the filter head being provided with a central inspirator tube which in the inverted position of the inner bowl extends to the proper elevation above the layer of coffee grounds to cause air to be drawn upwardly therethrough to relieve the vacuum during the filtering operation quickly enough so as not to impede the operation.

The invention is illustrated in the accompanying drawing, in which—

Fig. 1 is a central vertical section through a coffee brewer made in accordance with my invention, the inner bowl being shown in full lines in inverted filtering position and in dotted lines in brewing position;

Fig. 2 is a face view of the filtering head taken on the line 2—2 of Fig. 1;

Fig. 3 is a developed sectional detail on the arcuate line 3—3 of Fig. 2;

Fig. 4 is a fragmentary view illustrating partly in side elevation and partly in section the application of the filter head and filter cloth onto the rim of the inner bowl;

Figs. 5 and 6 are fragmentary views illustrating the way in which the specially constructed lid fits on the outside of the rim of the inner bowl and inside the rim of the outer bowl, and Fig. 7 is a face view of a portion of a filter head like that shown in Fig. 2 but having the spokes of the spider portion thereof flanged, as indicated in the sectional detail Fig. 8, which is taken on the line 8—8 of Fig. 7.

Similar reference numerals are applied to corresponding parts throughout the views.

Referring to Fig. 1, the reference numerals 9 and 10 designate the inner and outer bowls of the double-boiler type coffee brewer of my invention. Both are preferably made of glass, although either or both may, of course, be made of aluminum or other material and porcelain enameled, if desired. 11 is a pouring lip or spout provided on the outer bowl 10 so that it may be used as the coffee server in addition to being the boiler. A handle 12 is suitably secured to the bowl 10 by a metal band 13 which fits between the annular beads 14 formed on the rim 15 of the bowl. Another band 16 is similarly mounted on the beaded portion 17 of the inner bowl 9 in spaced relation to the reduced rim portion 18 thereof and carries a handle 19. One of the beads 17 serves as a means for supporting the inner bowl 9 upon the rim 15 of the outer bowl in the inverted filtering position illustrated in full lines, and the other bead similarly supports the bowl in the brewing position, indicated in dotted lines. A lid or cover 20, which is preferably made of glass to match the bowls 9 and 10, has an annular downwardly projecting flange 21 of a diameter to fit over the outside of the rim 18 of the inner bowl 9 and inside the rim 15 of the outer bowl 10, as illustrated in Figs. 5 and 6, respectively. There are outwardly projecting lugs 22 formed on the rim 18 of the inner bowl 9 in uniformly circumferentially spaced relation to cooperate with inwardly projecting lugs 23 formed on the rim 24 of the sheet metal filter head 25 that is adapted to be applied over the outside of the rim 18 of the inner bowl 9 in the manner illustrated in Figs. 1 and 4. The flange 21 on the lid 20 is therefore cut away, as indicated at 26, to accommodate the lugs 22 when the lid 20 is placed on the rim 18 of the inner bowl 9, as illustrated in Fig. 5. The lid 20 will be used on the inner bowl 9 usually only when the device is being used as a double-boiler, because when it is being used as a coffee brewer, it is customary to have the filter head 25 applied to the rim 18, clamping a filter cloth 27 in place thereon, as shown in Fig. 4, so that after the coffee is brewed and is ready to be filtered, the filter head is in readiness for the filtering operation. The lid 20, in so far as the use of the device as a coffee brewer is concerned, will ordinarily be used only on the outer bowl 10 when the latter is being used as a coffee server. The flange 21 on the lid 20 may, if desired, be used to close the pouring spout 11, the lid being turned to bring one of the cut away portions 26 into register with the spout only when pouring coffee.

The rim 24 of the filter head 25 is a trifle larger in inside diameter than the outside diameter of the rim 18 so that the marginal portion of the filter cloth 27 can be entered between the rims 24 and 18, as shown at 28 in Figs. 1 and 4, and will cause the filter head 25 to fit snugly on the rim 18 even before the head 25 is turned in the direction of the arrow 29 shown in Fig. 4 to bring the lugs 23 into position under the lugs 22 and by wedging engagement therewith lock the filter head securely in place. Obviously the marginal portion 28 of the filter cloth 27 in this operation will be gripped between the lugs 22 and 23, and in that way the filter head is still more securely held in place, there being no likelihood of the lugs 23 backing off the lugs 22 even when, as in actual practice, the filter head is turned with very little force toward the locked position shown in Fig. 4. The filter cloth, in other words, frictionally resists turning of the filter head 25 and hence it is only important to get the lugs 23 in position under the lugs 22 to prevent axial displacement of the filter head 25 off the rim 18. When the filter head 25 is applied in this manner with the filter cloth 27 dry, there will be no difficulty later in turning the filter head in the opposite direction to remove it after the coffee has been filtered. The filter head is of open spider construction with radial spokes 30 in the spider portion 31 defining large segmental-shaped openings 32 therebetween where large areas of the filter cloth 27 will be exposed to expedite filtering. If desired, I may provide a filter head like that shown at 25' in Fig. 7 with spokes 30' having outwardly projecting longitudinal flanges 33 provided on the edges thereof. With such a construction, one can readily exert pressure laterally against the spokes of the filter head with the fingers when removing the filter head from the bowl, the flanges affording broad enough surfaces so that there will be no danger of cutting or scratching the fingers in handling the filter head in this manner. Furthermore, such flanges afford reenforcement for the spokes of the filter head, so that the spider portion 31' is not apt to get bent out of shape. The flanges being outwardly projecting will not interfere with the filter cloth 27 fitting snugly against the inner surface of the filter head.

The filter cloth 27 has a center hole 34 through which an elongated tapered inspirator tube or nozzle 35 is arranged to be entered with a tight fit, as indicated in Fig. 1. This tube is entered in a center hole in the central portion 36 of the spider portion 31 of the filter head and is suitably secured in place in said hole as by swedging, the tube being drawn from sheet metal, as indicated by its thin walls and being therefore adapted for such assembling. The small end of the tube has a restricted air inlet orifice 37 provided therein. The central portion 36 of the spider 31 is offset in relation to the outer marginal portion 38 next to the rim 24, as clearly appears in Fig. 1, so that the orifice end of the tube 35 will be disposed substantially above the elevation of the layer of coffee grounds, indicated by dot and dash lines at 39 in Fig. 1, when the inner bowl 9 is inverted for the filtering operation. This also brings the orifice end of the tube 35 sufficiently closer to the level of the unfiltered coffee in the inverted bowl 9, indicated by the dot and dash line at 40 in Fig. 1, to insure good bubbling of air, as indicated at 41, through the intervening liquid to relieve the vacuum. The filter cloth 27 in the filtering operation bulges downwardly through the openings 32 under the weight of the coffee grounds and the unfiltered coffee above, as illustrated in Fig. 3, and the coffee drops from the cloth 27 mainly at the middle of these bulged portions, that is, along the lines a—a, b—b, c—c, and d—d of Fig. 2. Incidentally, this sagging of the filter cloth 27 between the spokes 30 further insures keeping the upper level 39 of the coffee grounds below the orifice end 37 of the tube 35, so that there will be no interference with the inlet of air.

In operation, the inner bowl 9, containing ground coffee and the appropriate amount of water, is placed in the outer bowl 10, as shown in dotted lines in Fig. 1, after enough water has been put in the outer bowl to boil without danger of overflowing. This double-boiler then brews the coffee in the inner bowl 9, and it takes from eight to ten minutes to produce fairly strong coffee. The brewing time will be varied to suit the taste. In the brewing process, the liquid in the inner bowl never reaches scalding temperature, and I have found that a mellow flavored coffee is obtained free of any acrid taste so frequently found in coffee made in other ways. The filter head 25 and filter cloth 27 will be applied to the inner bowl usually before the coffee is brewed, so that as soon as the coffee is prepared, the inner bowl 9 can be removed by means of the handle 19 and the water can be poured out from the outer bowl 10, using the handle 12. Then the inner bowl is inverted over the outer bowl, resting with its beaded rim portion fitting in the rim portion of the outer bowl, as shown in full lines in Fig. 1. The filtered coffee drops from the filter head 25 into the bowl 10, as indicated at 42, while air is admitted between the rims of the bowls, as indicated at 43, to pass upwardly through the inspirator tube 35 and bubble through the unfiltered coffee, as indicated at 41. The acceleration of filtering resulting from the openwork construction of the filter head 25 and the free inlet of air through the inspirator tube 35 to relieve vacuum above the unfiltered coffee in the inner bowl 9 both are responsible for shortening the filtering time. When all of the coffee has been filtered, the inner bowl 9 is removed and the lid 20 is placed on the bowl 10 and the latter then is used as the coffee server. The outer bowl 10 is hot when the coffee is filtered into it, which is obviously advantageous because the coffee can then be served piping hot, as many prefer it. I have found that the orifice 37 must be restricted so that it bears a certain relationship to the combined filtering area of the openings 32, otherwise coffee will flow downwardly through the tube 35 instead of air flowing upwardly therethrough. The elevation of the orifice 37 in relation to the openings 32 is also important, apparently because the air will bubble through the unfiltered coffee only if the path from the orifice 37 to the level 40 is sufficiently shorter than any other possible path of air travel through the filter head. The air is, of course, drawn upwardly through the unfiltered coffee by reason of the reduction in pressure created above the liquid level as the liquid filters through the filter head.

In conclusion, it should be understood that I do not limit myself to the use of the filter cloth 27 because I have found that a fine mesh Monel metal gauge is satisfactory for the filtering medium and, of course, will last indefinitely. I may on the other hand use a coarser mesh screen in combination with filter paper, the latter serving as the filter medium and the screen as its backing or support.

It is believed the foregoing description conveys a good understanding of the objects and advantages of my invention. The appended claims have been drawn with a view to covering all legitimate modifications and adaptations.

I claim:

1. The combination with an outer bowl having a rim portion, and an inner bowl adapted to be supported on the rim portion of the outer bowl and also having a rim portion, of a filter head having a rim portion detachably secured to the rim portion of the inner bowl and also having a spider portion within the rim portion which together define enlarged segmental-shaped filter openings between the substantially radial spokes thereof, a sheet of filtering material covering said filter openings and clamped about its marginal edge portion between the rim portion of the filter head and the rim portion of the inner bowl, and an air inspirator nozzle projecting from the central portion of said spider through an opening in the sheet of filtering material into the second bowl and having a small air inlet orifice provided in the inner end thereof, the nozzle projecting into said inner bowl a distance which represents a small fraction of the depth of the bowl, and said orifice being too small for passage of liquid downwardly therethrough in the inverted filtering position of the second bowl but large enough for passage of air upwardly therethrough to relieve vacuum in the inner bowl above the level of liquid therein.

2. The combination with an outer bowl having a rim portion, and an inner bowl adapted to be supported on the rim portion of the outer bowl and also having a rim portion, of a filter head having a rim portion detachably secured to the rim portion of the inner bowl and also having a spider portion within the rim portion which together define enlarged segmental-shaped filter openings between the substantially radial spokes thereof, a sheet of filtering material covering said filter openings and clamped about its marginal edge portion between the rim portion of the filter head and the rim portion of the inner bowl, said spider portion having its spokes inclined to offset the central portion thereof relative to the rim portion a predetermined distance into the inner bowl, and an air inspirator nozzle carried on the central portion of said spider and projecting therefrom through an opening in the sheet of filtering material into the inner bowl to a predetermined level therein and having a restricted air inlet orifice provided in the inner end thereof.

3. The combination with an outer bowl having a rim portion, and an inner bowl adapted to be supported on the rim portion of the outer bowl and also having a rim portion, of a filter head having a rim portion detachably secured to the rim portion of the inner bowl and also having a spider portion within the rim portion which together define enlarged segmental-shaped filter openings between the substantially radial spokes thereof, a sheet of filtering material covering said filter openings and clamped about its marginal edge portion between the rim portion of the filter head and the rim portion of the inner bowl, and an air inspirator nozzle carried on the central portion of said spider and projecting therefrom through an opening in the sheet of filtering material into the inner bowl to a predetermined level therein and having a restricted air inlet orifice provided in the inner end thereof.

4. A combination as set forth in claim 3, wherein the filter head has longitudinal outwardly projecting flanges provided on the edges of the spokes of the spider portion thereof.

5. A combination as set forth in claim 3, wherein the filter head is attachable to and detachable from the rim portion of the inner bowl by rotary movement, and wherein said filter head has longitudinal outwardly projecting flanges provided on the edges of the spokes of the spider portion thereof, substantially as and for the purpose described.

6. As an article of manufacture, a filter head for a coffee brewing container comprising an annular rim for application to the container and a spider portion within said rim adapted to support a sheet of filtering material on the inner side thereof covering the enlarged segmental-shaped openings left between the spokes of the spider portion and said annular rim, and an elongated air inspirator nozzle projecting from the central portion of said spider portion on the inner side thereof and adapted to extend through a hole provided therefor in the sheet of filtering material, said nozzle having a longitudinal hole provided therein extending from the inner end thereof to the outer side of the filter head.

7. As an article of manufacture, a filter head for a coffee brewing container comprising an annular rim for application to the container and a spider portion within said rim adapted to support a sheet of filtering material on the inner side thereof covering the enlarged segmental-shaped openings left between the spokes of the spider portion and said annular rim, and an elongated air inspirator nozzle projecting from the central portion of said spider portion on the inner side thereof and adapted to extend through a hole provided therefor in the sheet of filtering material, said nozzle having a longitudinal hole provided therein extending from the inner end thereof to the outer side of the filter head, the spider portion having the spokes thereof inclined inwardly with respect to the plane of the filter head so as to offset the central portion thereof and correspondingly elevate the nozzle with relation to the rest of the filter head.

8. As an article of manufacture, a filter head for a coffee brewing container comprising an annular rim for application to the container and a spider portion within said rim adapted to support a sheet of filtering material on the inner side thereof covering the enlarged segmental-shaped openings left between the spokes of the spider portion and said annular rim, the central portion of said spider portion having a circular opening provided therein, and an elongated tapered air inspirator nozzle adapted to be mounted in said opening, said nozzle being formed from a single piece of sheet metal, the enlarged end being open and fitting in said opening and the other end having a restricted orifice provided therein of small diameter in relation to the diameter of the other end of the nozzle.

9. As an article of manufacture, a filter head for a coffee brewing container comprising an annular rim for application to the container and a spider portion within said rim adapted to support a sheet of filtering material on the inner side thereof covering the enlarged segmental-shaped openings left between the spokes of the spider portion and said annular rim, the central portion of said spider portion having a circular opening provided therein, and an elongated tapered air inspirator nozzle adapted to be mounted in said opening, said nozzle being formed from a single piece of sheet metal, the enlarged end being open and fitting in said opening and the other end having a restricted orifice provided therein of small diameter in relation to the diameter of the other end of the nozzle, said spider portion being formed from sheet metal and having the spokes thereof bent inwardly in relation to the plane of the filter head to offset the central portion of the spider portion and accordingly elevate the nozzle relative to the plane of the filter head.

HENRY F. KORS.